Oct. 10, 1933.  E. ROSS-SMITH  1,929,653
DEVICE FOR MANUFACTURING HOLLOW PAPER BODIES FROM AQUEOUS
FIBROUS PULP AFTER THE COUCHING METHOD
Filed May 21, 1932
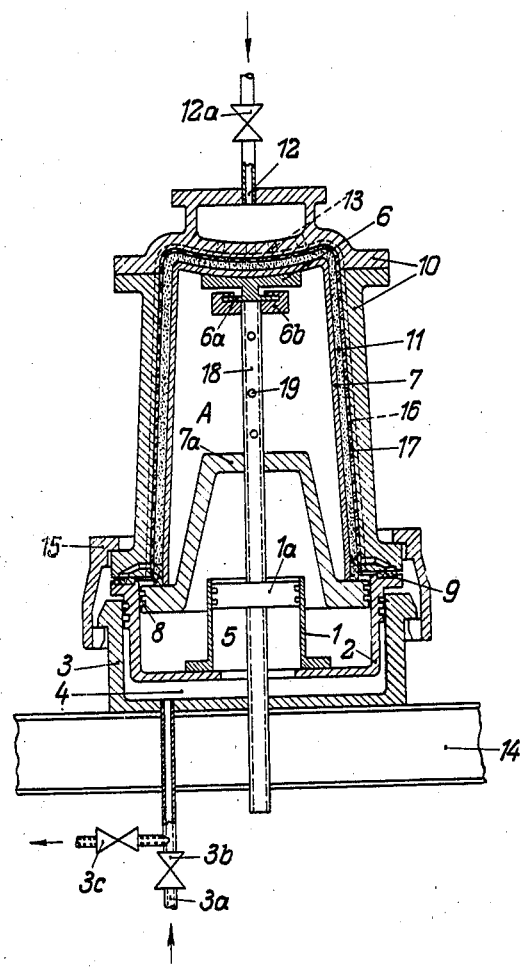
Inventor:

UNITED STATES PATENT OFFICE 1,929,653

DEVICE FOR MANUFACTURING HOLLOW PAPER BODIES FROM AQUEOUS FIBROUS PULP AFTER THE COUCHING METHOD

Ewen Ross-Smith, Penig, Germany, assignor to Investira S. A., Lausanne, Switzerland Application May 21, 1932, Serial No. 612,842, and in Germany May 12, 1931

2 Claims. (Cl. 92—59)

The present invention relates to the manufacture of hollow paper bodies from fibrous aqueous pulp after the couching method. In the known method the hollow paper bodies are, as is known, made in an external mold, the so-called couching mold, in which, according to the thickness of the wall of the hollow paper body to be made, a plurality of layers of the respective fibrous material are couched in by means of suitable sieves constituting an internal mold; thereafter the layers are subjected to pressure and they are drained by means of suitably designed further internal molds; finally, the thus formed hollow paper bodies which are pressed onto the inner wall of the couching mold are removed therefrom and dried.

Removing the still soft hollow paper bodies from the couching mold in as short a time as possible without doing any damage to them and with possibly simple and reliably acting means constitutes a comparatively difficult part of the entire procedure of manufacturing hollow paper bodies after the couching method, the more, as said bodies are generally of considerable size.

The improved method forming a part of the present invention is characterized chiefly by the features that removing the pressed and drained hollow paper bodies from the couching mold is effected by means of a vertically movable stripping mold with the aid of a difference between pressures produced between the couching mold and the stripping mold and causing the paper body to get detached from the couching mold and to be pressed onto the stripping mold. Thereafter this latter mold is lowered automatically also by an excess of air-pressure acting on it in the direction from the couching mold, and finally the stripping mold and all members supporting it are further lowered so much that the hollow paper body located upon the stripping mold is freely accessible and can be removed.

This manner of operation renders it possible to make use of a couching mold which is not divided, that is to say, is not composed of a plurality of parts which must be separated from one another and spread out in order to afford access to the hollow paper body produced within that mold. The couching mold is, therefore, by far simpler and cheaper.

I am aware of the fact that the use of compressed air for detaching paper pulp plates and similar articles from punches and the like, as well as from perforated cylinders, has already been proposed, but the method employed for those purposes and the means used in connection therewith cannot possibly be employed for the comparatively thin-walled and thus only little resistive hollow paper bodies after the couching method, in that the danger of destroying these bodies when removing them from the molds is very great. Counter thereto, the present improved method and the present improved means for carrying out this method permit the manufacture of hollow paper bodies of unobjectionable quality, also quickly and at reduced costs.

The improved device for carrying out the improved method is illustrated diagrammatically and by way of example on the accompanying drawing which shows an axial section through that device, the stripping mold being shown in its highest position within the couching mold. In this figure, 11 denotes the hollow paper body which has been produced in known manner by the co-operation of a sieve-forming internal mold (not shown in the drawing because it pertains to a preceding phase of the method) with the undivided external mold 10 which is the couching mold. Said body 11 is now to be removed by means of compressed air which is supplied through the pipe 12 that is provided with a regulating valve 12$^a$ the compressed air enters first into a chamber provided in the uppermost part of the casing forming the couching mold and passes then through a bore 13 provided in the bottom of said chamber.

7 denotes the vertically movable interior body support which when being in its lowermost position is located so much below the mold 10 that it is accessible on all sides. 14 is a member forming part of a frame which can be lifted, for instance hydraulically, and supports a cylindrical member 3 which in turn encloses a similar member 2 which extends into the space 4 of the member 3 and carries on its bottom an upwardly directed cylinder 1. The cylindrical member 3 is surrounded with a bayonet ring 15, by means of which it can be coupled with the external or couching mold 10 when the member 14 has been lifted into the position of height shown in the drawing.

From the interior of the cylindrical member 2 extends upwardly a conical member 7$^a$ having at its lower end a flange upon which rests the supporting member 7. The body 7$^a$ and the mold 7 are lifted together with the members 14, 3 and 2.

The compressed air is supplied through a pipe 3$^a$ provided with a valve 3$^b$, and that air streams then into the chamber 4 of the cylindrical member 3 and into the chamber 5 of the cylinder 1.

In this cylinder is a piston 1ª. The cylindrical member 2 constitutes a piston of the cylindrical member or cylinder 3, and the two pistons 1ª and 2 will be lifted by the compressed air. The piston 1ª is firmly connected with a hollow rod 18 and this rod is firmly connected with the conical body 7ª which is guided in the cylindrical member or piston 2. The flanged lower end of the body 7ª is provided with packing rings 8. The rod 18 constitutes the central axis of the device. Attached to the top of this rod is a guide member 6ᵇ f or a laterally shiftable plate 6ª which is firmly connected with a larger plate 6 that contacts with the top of the supporting member 7 which in turn contacts with the top of the hollow paper body 11. The free play between the parts 6ª and 6ᵇ permits the plate 6 to adjust its self, automatically, to its proper position with respect to the top of the stripping mold.

Between the cylindrical member 2 and the lower end of the mold 10 is a packing ring 9 by which any escape of the compressed air conducted into the system is prevented.

Within the mold 10 is a body 17 of perforated sheet-metal, and in the inner surface of the mold 10 are grooves 16 through which the compressed air supplied through the pipe 12 and the bore 13 is distributed around the mould 10. These grooves communicate with the bore 13 through radial grooves provided in the mold 10 below the top chamber of the same. From the circumferential grooves 16 the compressed air can stream through the perforations of the sheet-metal body 17 on the hollow paper body located between said sheet-metal body and the inner mold 7.

The space A within the mold 7 communicates with the outer air through bores 19 provided in the wall of the tube 18. The compressed air filling the grooves 16 of the mold 10 presses the paper off from the perforated sheet-metal body 17 and presses it against the stripping mold. Escape of the compressed air is prevented by the packings 8 and 9. The pressure of the compressed air can be regulated by the valve 12ª.

As also the members 1ª and 2 are subjected to the pressure of compressed air, the lifted interior system of the device remains at first in its lifted position, but after a certain period of action of the compressed air this pressure overcomes the inner pressure and depresses the stripping mold 7 with the paper body thereon. When this stage of the procedure has been attained, the supply valve 3ᵇ is closed and the discharge valve 3ᶜ is opened so that the compressed air present in the spaces 4 and 5 can escape. Now the bayonet ring 15 is so turned that the cylinder 3 and the mold 10 are uncoupled from one another, whereafter the frame member 14 with all those parts of the device that it supports is so much lowered that the stripping mold with the hollow paper body thereon is freely accessible so that this body can be easily removed, either manually or mechanically, as the case may be. I do not enter into details concerning this phase as it does not form a part of this invention.

I wish it also to be understood that I do not limit myself merely to the details of the constructional form of the device illustrated solely by way of example. Various departures in the details are possible without a departure from the invention.

I claim:

1. Apparatus for transferring a hollow body of soft pulp from the interior of a mold to the exterior surface of a supporting member comprising a hollow rod, means thereon for sustaining the supporting member, said rod having a bore in its side communicating with the interior thereof and the interior of the supporting member, a movable member surrounding the rod and upon which the supporting member rests, a piston mounted upon the rod, a cylinder slidable receiving said piston, means for admitting pressure under said piston and means for admitting pressure into the mold and applying the same to the exterior surface of the pulp body.

2. Apparatus for transferring a hollow body of soft pulp from the interior of a mold to the exterior surface of a supporting member comprising a hollow rod, means thereon for sustaining the supporting member, said rod having a bore in its side communicating with the interior thereof and the interior of the supporting member, a movable member surrounding the rod and upon which the supporting member rests, a piston mounted upon the rod, a cylinder slidably receiving said piston, a cylindrical member supporting said cylinder and slidably receiving said movable member, an outer cylindrical member slidably receiving the first mentioned cylindrical member, means for admitting pressure under said piston and between said cylindrical members and means for admitting pressure into the said mold and applying the same to the exterior surface of the pulp body.

EWEN ROSS-SMITH.